US010723667B1

(12) United States Patent
Merritt

(10) Patent No.: US 10,723,667 B1
(45) Date of Patent: Jul. 28, 2020

(54) FULLY WATER-SOLUBLE GRANULE ENRICHED IN HUMIC ACID

(71) Applicant: Kevin Merritt, St. Augustine, FL (US)

(72) Inventor: Kevin Merritt, St. Augustine, FL (US)

( * ) Notice: Subject to any disclaimer, the term of this patent is extended or adjusted under 35 U.S.C. 154(b) by 101 days.

(21) Appl. No.: 15/878,782

(22) Filed: Jan. 24, 2018

Related U.S. Application Data

(63) Continuation-in-part of application No. 14/738,865, filed on Jun. 13, 2015, now Pat. No. 9,914,670.

(60) Provisional application No. 62/013,789, filed on Jun. 18, 2014.

(51) Int. Cl.
*C05G 5/12* (2020.01)
*C05F 11/02* (2006.01)

(52) U.S. Cl.
CPC ............... *C05G 5/12* (2020.02); *C05F 11/02* (2013.01)

(58) Field of Classification Search
CPC .......... C05G 3/0058; C05G 5/12; C05F 11/02
See application file for complete search history.

(56) References Cited

U.S. PATENT DOCUMENTS

| | | | |
|---|---|---|---|
| 3,700,728 A | 10/1972 | Moschopedis et al. | |
| 3,932,166 A | 1/1976 | Vignovich et al. | |
| 4,015,972 A | 4/1977 | Watkins et al. | |
| 4,459,149 A | 7/1984 | Moran et al. | |
| 5,026,416 A | 6/1991 | Alexander | |
| 5,034,045 A | 7/1991 | Alexander | |
| 5,876,479 A | 3/1999 | Hedgpeth | |
| 8,388,722 B2 | 3/2013 | Lynch et al. | |
| 9,914,670 B1 | 3/2018 | Merritt | |
| 2008/0216534 A1 | 9/2008 | Karr | |
| 2011/0259067 A1* | 10/2011 | Lynch | A01N 25/14 71/24 |

FOREIGN PATENT DOCUMENTS

| | | |
|---|---|---|
| CN | 101024590 B | 11/2010 |
| CN | 202148263 U | 2/2012 |
| CN | 101768019 B | 12/2012 |
| CN | 102898254 A | 1/2013 |
| CN | 101935243 B | 7/2013 |
| CN | 102875248 B | 10/2014 |
| EP | 1216976 A2 | 6/2002 |
| IN | 02359CH2010 | 9/2010 |
| RU | 2491266 C1 | 1/2013 |
| WO | 9533702 A1 | 12/1995 |
| WO | 2010094985 A1 | 8/2010 |
| WO | 2013057168 A2 | 4/2013 |

OTHER PUBLICATIONS

The Andersons. Products—Andersons Humates | Humic DG . <https://andersonshumates.com/products/ > May 21, 2013.*
Humic DG Product Label. 2016.*

(Continued)

*Primary Examiner* — Jennifer A Smith
(74) *Attorney, Agent, or Firm* — Middleton Reutlinger

(57) ABSTRACT

Disclosed is a process for making a water-soluble granule enriched in humic acid. Disclosed also is a water-soluble granule enriched in humic acid. Such a granule is useful as an organic aid to crop growth, particularly in applications where solubility is desirable or necessary.

10 Claims, 1 Drawing Sheet

(56) References Cited

OTHER PUBLICATIONS

Environmental Fertilisers. "EF Soluble Humate Granules". pp. 1-2. <http://environmentalfertilisers.co.nz/ef-soluble-humate-granules/> Jun. 21, 2013.*

Wikipedia. "Potassium humate". <https://en.wikipedia.org/wiki/Potassium_humate> Mar. 7, 2013.*

Wang et al., Evaluation of Methods of Determining Humic Acids in Nucleic Acid Samples for Molecular Biological Analysis, Biosci. Biotechnol. Biochem., 75(2), 355-357, 2011.

AGN Microbial Selection and Sub-Profiling, Cisbay, www.cisbay.com.

Van Zomeren, Measurement of Humic and Fulvic Acid Concentrations and Dissolution Properties by a Rapid Batch Procedure, Environ. Sol. Technol., 41 (19), pp. 6755-6761, 2007.

Babalola, Beneficial bacteria of agricultural importance, Biotechnol Lett, 32, 1559-1570, 2010.

Comans et al., Concentrations of total dissolved organic carbon and humic and hydrophilic sub-fractions extracted from major Dutch soil types and their relation with soil properties, Geophysical Research Abstractsvol. 15, EGU2013-13841, 2013.

Grow More; Humic/Fulvic Acids, pp. 1-7, Dec. 31, 2003.

Halliday, The relationship between Humalite, Leonardite, and Fertilizers, Black Earth, 2015.

Humic Growth Solutions; Diamond-Grow Organic 100% Water Soluble Spray Dried Humic Acid Powder, pp. 1-2, Jacksonville, FL Dec. 31, 2013.

Topp, Bacteria in agricultural soils: Diversity, role and future perspectives, Canadian Journal of Soil Science, 83, 303-309, 2003.

Javanshah et al., Determination of Humic Acid by Spectrophotometric Analysis in the Soils, International Journal of Advanced Biotechnology and Research (IJBR), vol. 7, pp. 19-23, Special Issue—Apr. 2016.

Lamar et al., A New Standardized Method for Quantification of Humic and Fulvic Acids in Humic Ores and Commercial Products,Journal of AOAC International, 97, 721-730, 2014.

Mineral Logic, LLC, Bioactive Fulvic, Testing Method, Natural Organic Matter Research, 2017.

Myneni, Functional Group Chemistry of Humic Substances, Molecular Environmental Geochemistry Group, The Department of Geosciences, Princeton University, Guyot Hall Princeton, NJ 08544.

U.S. Appl. No. 15/878,773, filed Jan. 24, 2018 titled "Process for Making a Fully Water-Soluble Granule Comprising Humic Acid and a Microbial Community Composition".

U.S. Appl. No. 16/210,646, filed Dec. 5, 2018 titled "Process for Making a Semi-Soluble Granule Rock Phosphate and Humic Acid".

U.S. Appl. No. 16/266,749, filed Feb. 4, 2019 titled "Potassium Humate Sulfur Compound Granule".

U.S. Appl. No. 16/387,131, filed Apr. 17, 2019 titled "Process for Making a Composite Granule With Rock Phosphate, Sulfur, and Humic Acid".

* cited by examiner

FULLY WATER-SOLUBLE GRANULE ENRICHED IN HUMIC ACID

FIELD OF THE INVENTION

A process such as is described in various embodiments herein relates to a process for making a fully water-soluble granule enriched in humic acid. Such a granule is useful as an organic aid to crop growth, particularly in applications where solubility is desirable or necessary.

BACKGROUND OF THE INVENTION

Extraction of humic acid and related materials from carbonaceous raw materials such as humalite, leonardite, sub-bituminous coal, menefee, peat, and the like has been practiced for years and is accordingly known in the art. Process steps vary, but the process output is generally a particulate material with suboptimal solubility in water.

It is known that humic substances (HS) include fulvic acid, humic acid, and/or humin. Of these, fulvic acid has the lowest molecular weight and least resistance to decomposition by microorganisms; humin has the highest molecular weight and greatest resistance to decomposition, because it has a large number of negative charges per unit mass, humin also has a very high CEC. The large molecules of humus bind to clay particles and greatly increase aggregate formation and stability therefore improving soil properties. Humin is the alkali (and acid) insoluble portion of HS that many manufacturers dispose of, although it is known that there are individuals who may extract and use it.

Since it takes longer for dry lignite to be broken down, and thus be functional in the soil, it is necessary to convert the lignite into forms that provide a more timely overall benefit (e.g. transformation into a water-soluble form). Such a conversion "unrolls" the tight molecular ball of lignite and creates water-soluble humic acids, either as a liquid or in the form of sodium, potassium, or ammonium salts (known as humates). Such a water-soluble form is desirable, as in their soluble form, humic acids can readily chelate nutrients, preserve nitrates from leaching, enhance root development, and improve overall crop vigor and yields.

Attempts to create a fully water-soluble granule enriched in humic acid have been unsuccessful. It is known that there are humic acid enriched granules that have solubility as high as about 85%, but even these are not fully water-soluble. For example, granules such as those discussed in CN 102898254. The raw humic materials undergo chemical reactions prior to granulating, in CN 102898254, but even with that the granule itself contains other insoluble portions, thus preventing the granule from achieving a full water solubility.

Suboptimal solubility in water of particulate material enriched in humic acid and related materials presents a problem. Because organic and other producers typically prefer to apply mixtures that contain solvents such as water that are safe and healthful for both plants and workers, there is a need, long-felt by now, for a process for making a fully water-soluble granule enriched in humic acid.

SUMMARY OF EMBODIMENTS

The present embodiments provide one or more of the features recited in the appended claims and/or the following features which alone or in combination, may comprise patentable subject matter.

In a first aspect, a fully water-soluble granule is disclosed, where the fully water-soluble granule includes: a homogenous power including a hydrolyzed humic acid with a moisture content of about 9% to about 15% and a loose bulk density between about 28 and 49 pounds per cubic feet, where the hydrolyzed humic acid is extracted from leonardite or humalite; and where the homogenous powder is granulated via compaction to form the fully water-soluble granule, where the fully water-soluble granule is between about 0.5 mm and about 4.5 mm in diameter, and where about 95% of the fully water-soluble granule dissolves within five minutes when the fully water-soluble granule is submerged in one liter of water at a temperature of 25 degrees Celsius.

In some embodiments, the granule is between about 0.8 mm and about 2.0 mm in diameter. In other embodiments, the granule is between about 2.1 mm and about 4.0 mm in diameter.

In some embodiments, at least about 99% of the granule dissolves within five minutes when the granule is submerged in one liter of water at a temperature of 25 degrees Celsius. In other embodiments, at least about 95% of the granule dissolves within one minute when the granule is submerged in one liter of water at a temperature of 25 degrees Celsius. In still yet other embodiments, at least about 99% of the granule dissolves within one minute when the composite granule is submerged in one liter of water at a temperature of 25 degrees Celsius.

In some embodiments, the homogenous powder is granulated via compaction with a roller compactor at a speed of about 8 rpm and wherein the roller compactor exerts a pressure of about 1700 psi and does not exceed a temperature of about 130 degrees Fahrenheit.

In another aspect, a fully water-soluble granule enriched in humic acid is disclosed, where the granule is made by a process including the steps of: obtaining a sample of a carbonaceous substance comprising humic acid and one or more other substances; contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid; separating the sludge component from the extraction component; spray drying the extraction component, thereby forming a plurality of powder particles; and compacting, via a roll compactor, at least a portion of the plurality of powder particles, where the at least a portion of the plurality of powder particles, as a result of the compacting, are made into a form of a fully water-soluble granule with a diameter between about 0.5 mm and about 4.5 mm, where about 95% of the fully water-soluble granule dissolves within five minutes when the fully water-soluble granule is submerged in one liter of water at a temperature of 25 degrees Celsius.

In some embodiments, the roll compactor operates at a speed of about 8 rpm and exerts a pressure of about 1700 psi.

In some embodiments, the process further includes the steps of: rehydrating the fully water-soluble granule, thereby forming a rehydrated solution; and applying the rehydrated solution to a desired location.

BRIEF DESCRIPTION OF THE FIGURE

FIG. 1A illustrates the solubility comparison at time point zero, prior to placement of either material in the water. FIG. 1B illustrates the solubility comparison thirty (30) seconds after the raw humate and granules were placed in the water. FIG. 1C illustrates the solubility comparison five (5) minutes after the raw humate and granules were placed in the water.

DETAILED DESCRIPTION

Figure 1A:
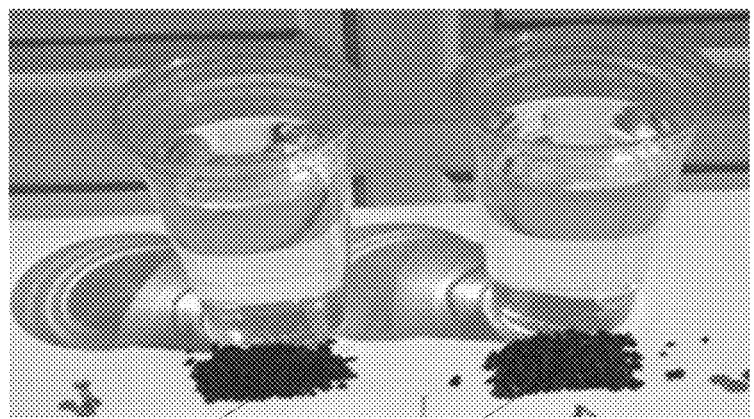
FIGS. 1A-C are a perspective photographic view of a solubility comparison between raw humate and an embodiment of a fully water-soluble granules enriched in humic acid described herein.

A process and composition such as is described in various embodiments herein now will be described more fully hereinafter. A process such as is described in various embodiments herein may, however, be embodied in many different forms and should not be construed as limited to the embodiments set forth herein; rather, these embodiments are provided so that this disclosure will be thorough and complete, and will fully convey the scope of a process such as is described in various embodiments herein to those skilled in the art. As used in this specification and the claims, the singular forms "a," "an," and "the" include plural referents unless the context clearly dictates otherwise. When used in this specification and the claims as an adverb rather than a preposition, "about" means "approximately" and comprises the stated value and every value within 10% of that value; in other words, "about 100%" includes 90% and 110% and every value in between.

When used in this specification and the claims, a "water-soluble granule" or "water-soluble composite granule" refers to a granule that dissolves readily in water under typical conditions of use. Furthermore, when used in this specification and the claims, a "fully water-soluble granule" refers to a granule that dissolves readily and entirely in water under typical conditions of use, specific examples of such solubility will be provided in the Example section.

When used in this specification and the claims, a product is "enriched in humic acid" if the product possesses a higher concentration of humic acid than a raw material from which the product is made. A component becomes "enriched in humic acid" as the concentration of humic acid in the component increases. A component becomes "depleted of humic acid" as the concentration of humic acid in the component decreases.

When used in this specification and the claims, a "carbonaceous substance comprising humic acid and one or more other substances" refers to a carbonaceous substance that contains humic acid and that also contains one or more other substances other than humic acid. An example is Humalite. An example is lignite. An example is Leonardite.

Aspects of a process such as is described in various embodiments herein are further illustrated by the following examples, which are set forth to illustrate certain aspects of a process such as is described in various embodiments herein and are not to be construed as limiting thereof.

In an example, production of a fully-water soluble granule enriched in humic acid was undertaken as a multi-step process comprising blending of raw material and an alkaline mixture in a blend tank; screening of the blended mixture that was made in the blend tank; drying of the liquid derived from screening of the blended mixture, thereby forming a fine powder; and conversion of the fine powder to form granules.

In an example, a blending of raw material with an alkaline mixture in a blend tank resulted in extraction of humic acid and other humic substances from the raw material. Hot water and caustic potash solution and Humalite were added to a thermally insulated tank in that order and blended. The hot water was at 160-180 degrees Fahrenheit. The caustic potash solution was 45% membrane grade. The mass ratio of hot water to caustic potash solution to Humalite was 73.7:5.8:20.5.

In an example, water, caustic potash solution and Humalite were placed into a thermally insulated tank to form a 42,000 lb mixture, which was then blended. The liquid phase was sampled, and a colorimetric assay for humic acid was performed on each sample, in which the amount of light absorbed was proportional to the concentration of humic acid.

In an example, a blended mixture prepared according to the paragraph immediately above consisted of liquid and sludge. This blended mixture was then pumped by a 3 HP motor to two 200 mesh screeners at a rate of ~40 gal/min (~350 lbs/min). It took ~120 minutes to screen 42000 lbs. The screener allowed liquids and very small particles to be passed through, but not the insoluble sand, clay, and humin fraction, also known as sludge. The amount of sludge varied, but typically the sludge was about 5-7% of the total weight of the blended mixture.

In an example, the sludge still possessed some humic content and was given away to local farmers free of charge. The screened humic acid enriched liquid, which had a density of 8.35-9 lb/gallon, was collected in an insulation tank, which had a capacity of 12500 gal. The humic acid enriched liquid was pumped from the insulation tank to a spray dryer firing tank from which it was transferred to a spray dryer.

In an example, a spray dryer system comprised a burner, a dryer, two cyclone separators, a baghouse and a powder hopper. Humic acid enriched liquid was processed at a rate of 14-16 gal/min. Hydraulic pressure-nozzle atomization was used in which liquid was passed through a filter and then through a hydraulic pressure pump. The pressure of the liquid was directly proportional to the force delivered by the hydraulic pressure pump and was generally 1500 psi but ranged from 1300-1700 psi depending on the moisture of the fine powder. The humic acid enriched liquid was then forced through 8 nozzles to break the liquid into fine droplets. Filtered air was passed through a burner where it was heated to 600-650 degrees Fahrenheit. The temperature of the inlet air never exceeded 800 degrees Fahrenheit. The hot air met the liquid droplets in a co-current manner for a time of about 2 seconds. This time was enough to remove more than 85% of the moisture from the dryer to form a humic acid enriched powder, which was collected in a common line. The air emerging out of the dryer still had some particles and was generally at 190-205 degrees Fahrenheit and never exceeded 250 degrees Fahrenheit. Heavier particles were collected using two cyclone separators in series and the lighter particles were collected using a baghouse filter. The hot gas, also called flue gas, was then emitted from the bag house; the hot gas consisted mostly of air and steam at 150-180 degrees Fahrenheit. The temperature of the exhaust never exceeded 250 degrees Fahrenheit. The humic acid enriched powder from the common line was then transferred to a powder hopper. Moisture content of the powder was measured and kept between 11%-13%. When the moisture was below 11%, moisture content was increased in either of two ways, by reducing the temperature of the burner or by operating the hydraulic pressure pump at a higher capacity which in turn increased the flow rate of the liquid. When the moisture was above 13%, moisture content was decreased in either of two ways, by increasing the temperature of the burner or by operating the hydraulic pressure pump at a lower capacity which in turn decreased the flow rate of the liquid. The loose bulk density of the humic acid enriched powder ranged from about 35 to about 42 pounds per cubic foot. The feed particle size distribution of a typical powder sample was as follows: 1.5% of the particles by weight were less than 100 microns; 15% of the particles by weight were less than 200 microns; 35% of the particles by weight were less than 270 microns; 55% of the particles by weight were less than 400 microns.

In an example, conversion of the fine powder to form the fully water-soluble granule enriched in humic acid was effected by an apparatus comprising a mechanical roller compactor, with pocket rollers at 8 rpm rotation and 1700 psi.

Compacted granules were blown out pneumatically and screened by means of a vibratory screener to achieve relative uniformity of size distribution. For example, granules of about 2.1 mm to about 4.0 mm were prepared for various agricultural uses, and granules of about 0.8 mm to about 2.0 mm were prepared for horticultural use. Resulting granules allow for easy transport, as well as application in dry farming systems.

Resulting granules dissolved readily in water) and have been found to aid plant growth in both agricultural and horticultural applications.

Aspects of a process such as is described in various embodiments herein are further illustrated by the following further examples, which are set forth to illustrate certain aspects of a process such as is described in various embodiments herein and are not to be construed as limiting thereof.

Further Example 1

A process for making a fully water-soluble granule enriched in humic acid, the process comprising:
  obtaining a sample of a carbonaceous substance comprising humic acid and one or more other substances;
  contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid;
  separating the sludge component from the extraction component;
  drying the extraction component, thereby forming a plurality of powder particles; compacting at least a portion of the plurality of powder particles under conditions wherein the at least a portion of the plurality of powder particles, as a result of the compacting, are made into a form of a fully water-soluble granule;
thereby making a fully water-soluble granule enriched in humic acid.

Further Example 2

A process according to further example 1, wherein the carbonaceous substance comprises a coal and/or a claystone and/or a mudstone and/or a shale.

Further Example 3

A process according to further example 1, wherein the carbonaceous substance comprises a lignite and/or a Leonardite and/or a Humalite.

Further Example 4

A process according to further example 1, wherein the carbonaceous substance comprises a Humalite.

Further Example 5

A process according to further example 1, wherein the alkaline mixture comprises water.

Further Example 6

A process according to further example 1, wherein the alkaline mixture comprises a base.

Further Example 7

A process according to further example 1, wherein the alkaline mixture comprises sodium hydroxide or potassium hydroxide.

Further Example 8

A process according to further example 1, wherein the alkaline mixture comprises caustic potash solution.

Further Example 9

A process according to further example 1, wherein the alkaline mixture comprises, by mass, between about 10 and about 15 parts water, and about 1 part caustic potash solution, wherein the caustic potash solution is 45% membrane grade.

Further Example 10

A process according to further example 1, wherein the alkaline mixture comprises, by mass, about 73.7 parts water and about 5.8 parts caustic potash solution, wherein the caustic potash solution is 45% membrane grade.

Further Example 11

A process according to further example 1, wherein the mass ratio of the alkaline mixture to the sample is between about 75:25 and about 84:16.

Further Example 12

A process according to further example 1, wherein the mass ratio of the alkaline mixture to the sample is between about 78:22 and about 81:13.

Further Example 13

A process according to further example 1, wherein the mass ratio of the alkaline mixture to the sample is about 79.5:20.5.

Further Example 14

A process according to further example 1, wherein the sludge component is maintained in contact with the extraction component for between about 4 hours and about 12 hours.

Further Example 15

A process according to further example 1, wherein the sludge component is maintained in contact with the extraction component for between about 6 hours and about 10 hours.

Further Example 16

A process according to further example 1, wherein the sludge component is maintained in contact with the extraction component for about 8 hours.

Further Example 17

A process according to further example 1, wherein the sludge component is maintained in contact with the extraction component for a period of time sufficient for the extraction component to possess a humic acid content of at least about 6%.

Further Example 18

A process according to further example 1, wherein the sludge component is maintained in contact with the extraction component for a period of time sufficient for the extraction component to possess a humic acid content of at least about 14%.

Further Example 19

A process according to further example 1, wherein the sludge component is maintained in contact with the extraction component for a period of time sufficient for the extraction component to possess a humic acid content of at least about 17%.

Further Example 20

A process according to further example 1, wherein the sludge component is maintained in contact with the extraction component for a period of time sufficient for the extraction component to possess a humic acid content of at least about 18%.

Further Example 21

A process according to further example 1, wherein the separating is effected by filtration.

Further Example 22

A process according to further example 1, wherein the separating is effected by sedimentation.

Further Example 23

A process according to further example 1, wherein the drying is effected by spray drying.

Further Example 24

A process according to further example 1, wherein the drying is effected by spray drying, and wherein the spray drying is characterized by an inlet temperature and an outlet temperature, and wherein the inlet temperature passing through a burner heats to between about 400 degrees Fahrenheit and about 800 degrees Fahrenheit, and wherein the outlet temperature is between bout 150 degrees Fahrenheit and about 250 degrees Fahrenheit.

Further Example 25

A process according to further example 1, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 26

A process according to further example 1, wherein the plurality of powder particles is characterized by a moisture content, and wherein the moisture content is between about 9% and about 15%.

Further Example 27

A process according to further example 1, wherein the plurality of powder particles is characterized by a moisture content, and wherein the moisture content is between about 10% and about 14%.

Further Example 28

A process according to further example 1, wherein the plurality of powder particles is characterized by a moisture content, and wherein the moisture content is between about 11% and about 13%.

Further Example 29

A process according to further example 1, wherein the plurality of powder particles is characterized by a loose bulk density, and wherein the loose bulk density is between about 28 and about 49 pounds per cubic foot.

Further Example 30

A process according to further example 1, wherein the plurality of powder particles is characterized by a loose bulk density, and wherein the loose bulk density is between about 31.5 and about 45.5 pounds per cubic foot.

Further Example 31

A process according to further example 1, wherein the plurality of powder particles is characterized by a loose bulk density, and wherein the loose bulk density is between about 35 and about 42 pounds per cubic foot.

Further Example 32

A process according to further example 1, wherein the plurality of powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 33

A process according to further example 1, wherein the compacting is effected by an apparatus comprising a roller compactor.

Further Example 34

A process according to further example 1, wherein the compacting is effected by an apparatus comprising a roller compactor, and wherein the speed of the roller compactor is about 8 rpm.

Further Example 35

A process according to further example 1, wherein the compacting is effected by an apparatus comprising a roller compactor, and wherein the pressure exerted by the roller compactor is about 1700 psi.

Further Example 36

A process according to further example 1, wherein the compacting is effected by an apparatus comprising a roller compactor, wherein the speed of the roller compactor is about 8 rpm, and wherein the pressure exerted by the roller compactor is about 1700 psi.

Further Example 37

A process according to further example 1, wherein the compacting is effected by an apparatus comprising a roller compactor, wherein the speed of the roller compactor is about 8 rpm, wherein the pressure exerted by the roller compactor is about 1700 psi, and wherein the temperature does not exceed about 130 degrees Fahrenheit.

Further Example 38

A process according to further example 1, wherein the fully water-soluble granule is between about 0.5 mm and about 4.5 mm.

Further Example 39

A process according to further example 1, wherein the fully water-soluble granule is between about 0.8 mm and about 4.0 mm.

Further Example 40

A process according to further example 1, wherein the fully water-soluble granule is between about 0.8 mm and about 2.0 mm.

Further Example 41

A process according to further example 1, wherein the fully water-soluble granule is between about 2.1 mm and about 4.0 mm.

Further Example 42

A process according to further example 1, wherein at least about 75% of the fully water-soluble granule is dissolved in five minutes when the granule is submerged in one liter of water at a temperature of 25 degrees Celsius.

Further Example 43

A process according to further example 1, wherein at least about 90% of the fully water-soluble granule is dissolved in five minutes when the granule is submerged in one liter of water at a temperature of 25 degrees Celsius.

Further Example 44

A process according to further example 1, wherein at least about 95% of the fully water-soluble granule is dissolved in five minutes when the granule is submerged in one liter of water at a temperature of 25 degrees Celsius.

Further Example 45

A process according to further example 1, wherein at least about 99% of the fully water-soluble granule is dissolved in five minutes when the granule is submerged in one liter of water at a temperature of 25 degrees Celsius.

Further Example 46

A process according to further example 1, wherein 100% of the fully water-soluble granule is dissolved in five minutes when the granule is submerged in one liter of water at a temperature of 25 degrees Celsius.

Further Example 47

A process according to further example 1, wherein at least about 75% of the fully water-soluble granule is dissolved in one minute when the granule is submerged in one liter of water at a temperature of 25 degrees Celsius.

Further Example 48

A process according to further example 1, wherein at least about 90% of the fully water-soluble granule is dissolved in one minute when the granule is submerged in one liter of water at a temperature of 25 degrees Celsius.

Further Example 49

A process according to further example 1, wherein at least about 95% of the fully water-soluble granule is dissolved in one minute when the granule is submerged in one liter of water at a temperature of 25 degrees Celsius.

Further Example 50

A process according to further example 1, wherein at least about 99% of the fully water-soluble granule is dissolved in one minute when the granule is submerged in one liter of water at a temperature of 25 degrees Celsius.

Further Example 51

A process according to further example 1, wherein 100% of the fully water-soluble granule is dissolved in one minute when the granule is submerged in one liter of water at a temperature of 25 degrees Celsius.

Further Example 52

A process according to further example 1, wherein the process further includes solubilizing the fully water-soluble granule, thereby forming a fully solubilized solution and applying the fully solubilized solution to a desired location.

Further Example 53

A process according to further example 1, wherein the process further includes applying the fully-water soluble granule to a desired location.

Aspects of a fully water-soluble composite granule such as is described in various embodiments herein are further illustrated by the following further examples, which are set forth to illustrate certain aspects of a process such as is described in various embodiments herein and are not to be construed as limiting thereof.

Further Example 54

A fully water-soluble granule enriched in humic acid, the granule made by a process comprising:
- obtaining a sample of a carbonaceous substance comprising humic acid and one or more other substances;
- contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture; maintaining the sludge component in contact with the extraction component for a period of time sufficient for the extraction component to become relatively enriched in humic acid and the sludge component to become relatively depleted of humic acid;
- separating the sludge component from the extraction component;
- drying the extraction component, thereby forming a plurality of powder particles; and compacting at least a portion of the plurality of powder particles under conditions wherein the at least a portion of the plurality of powder particles, as a result of the compacting, are made into a form of a fully water-soluble granule.

Further Example 55

A fully water-soluble granule according to further example 54, wherein the carbonaceous substance comprises a coal and/or a claystone and/or a mudstone and/or a shale.

Further Example 56

A fully water-soluble granule according to further example 54, wherein the carbonaceous substance comprises a lignite and/or a Leonardite and/or a Humalite.

Further Example 57

A fully water-soluble granule according to further example 54, wherein the carbonaceous substance comprises a Humalite.

Further Example 58

A fully water-soluble granule according to further example 54, wherein the alkaline mixture comprises water.

Further Example 59

A fully water-soluble granule according to further example 54, wherein the alkaline mixture comprises a base.

Further Example 60

A fully water-soluble granule according to further example 54, wherein the alkaline mixture comprises sodium hydroxide or potassium hydroxide.

Further Example 61

A fully water-soluble granule according to further example 54, wherein the alkaline mixture comprises caustic potash solution.

Further Example 62

A fully water-soluble granule according to further example 54, wherein the alkaline mixture comprises, by mass, between about 10 and about 15 parts water, and about 1 part caustic potash solution, wherein the caustic potash solution is 45% membrane grade.

Further Example 63

A fully water-soluble granule according to further example 54, wherein the alkaline mixture comprises, by mass, about 73.7 parts water and about 5.8 parts caustic potash solution, wherein the caustic potash solution is 45% membrane grade.

Further Example 64

A fully water-soluble granule according to further example 54, wherein the mass ratio of the alkaline mixture to the sample is between about 75:25 and about 84:16.

Further Example 65

A fully water-soluble granule according to further example 54, wherein the mass ratio of the alkaline mixture to the sample is between about 78:22 and about 81:13.

Further Example 66

A fully water-soluble granule according to further example 54, wherein the mass ratio of the alkaline mixture to the sample is about 79.5:20.5.

Further Example 67

A fully water-soluble granule according to further example 54, wherein the sludge component is maintained in contact with the extraction component for between about 4 hours and about 12 hours.

Further Example 68

A fully water-soluble granule according to further example 54, wherein the sludge component is maintained in contact with the extraction component for between about 6 hours and about 10 hours.

Further Example 69

A fully water-soluble granule according to further example 54, wherein the sludge component is maintained in contact with the extraction component for about 8 hours.

Further Example 70

A fully water-soluble granule according to further example 54, wherein the sludge component is maintained in contact with the extraction component for a period of time sufficient for the extraction component to possess a humic acid content of at least about 6%.

Further Example 71

A fully water-soluble granule according to further example 54, wherein the sludge component is maintained in contact with the extraction component for a period of time sufficient for the extraction component to possess a humic acid content of at least about 14%.

Further Example 72

A fully water-soluble granule according to further example 54, wherein the sludge component is maintained in contact with the extraction component for a period of time sufficient for the extraction component to possess a humic acid content of at least about 17%.

Further Example 73

A fully water-soluble granule according to further example 54, wherein the sludge component is maintained in contact with the extraction component for a period of time sufficient for the extraction component to possess a humic acid content of at least about 18%.

Further Example 74

A fully water-soluble granule according to further example 54, wherein the separating is effected by filtration.

Further Example 75

A fully water-soluble granule according to further example 54, wherein the separating is effected by sedimentation.

Further Example 76

A fully water-soluble granule according to further example 54, wherein the drying is effected by spray drying.

Further Example 77

A fully water-soluble granule according to further example 54, wherein the drying is effected by spray drying, and wherein the spray drying is characterized by an inlet temperature and an outlet temperature, and wherein the inlet temperature passing through a burner heats to between about 400 degrees Fahrenheit and about 800 degrees Fahrenheit, and wherein the outlet temperature is between about 150 degrees Fahrenheit and about 250 degrees Fahrenheit.

Further Example 78

A fully water-soluble granule according to further example 54, wherein the drying is effected by spray drying, and wherein the spray drying is characterized by an inlet temperature and an outlet temperature, and wherein the inlet temperature is between about 600 degrees Fahrenheit and about 650 degrees Fahrenheit, and wherein the outlet temperature is between about 150 degrees Fahrenheit and about 180 degrees Fahrenheit.

Further Example 79

A fully water-soluble granule according to further example 54, wherein the plurality of powder particles is characterized by a moisture content, and wherein the moisture content is between about 9% and about 15%.

Further Example 80

A fully water-soluble granule according to further example 54, wherein the plurality of powder particles is characterized by a moisture content, and wherein the moisture content is between about 10% and about 14%.

Further Example 81

A fully water-soluble granule according to further example 54, wherein the plurality of powder particles is characterized by a moisture content, and wherein the moisture content is between about 11% and about 13%.

Further Example 82

A fully water-soluble granule according to further example 54, wherein the plurality of powder particles is characterized by a loose bulk density, and wherein the loose bulk density is between about 28 and about 49 pounds per cubic foot.

Further Example 83

A fully water-soluble granule according to further example 54, wherein the plurality of powder particles is characterized by a loose bulk density, and wherein the loose bulk density is between about 31.5 and about 45.5 pounds per cubic foot.

Further Example 84

A fully water-soluble granule according to further example 54, wherein the plurality of powder particles is characterized by a loose bulk density, and wherein the loose bulk density is between about 35 and about 42 pounds per cubic foot.

Further Example 85

A fully water-soluble granule according to further example 54, wherein the plurality of humic acid enriched powder particles is characterized by a particle size distribution, and wherein, in the particle size distribution, about 1.5% of the particles by weight are less than about 100 microns, about 15% of the particles by weight are less than about 200 microns, about 35% of the particles by weight are less than 270 microns, and about 55% of the particles by weight are less than about 400 microns.

Further Example 86

A fully water-soluble granule according to further example 54, wherein the compacting is effected by an apparatus comprising a roller compactor.

Further Example 87

A fully water-soluble granule according to further example 54, wherein the compacting is effected by an apparatus comprising a roller compactor, and wherein the speed of the roller compactor is about 8 rpm.

Further Example 88

A fully water-soluble granule according to further example 54, wherein the compacting is effected by an apparatus comprising a roller compactor, and wherein the pressure exerted by the roller compactor is about 1700 psi.

Further Example 89

A fully water-soluble granule according to further example 54, wherein the compacting is effected by an apparatus comprising a roller compactor, wherein the speed of the roller compactor is about 8 rpm, and wherein the pressure exerted by the roller compactor is about 1700 psi.

Further Example 90

A fully water-soluble granule according to further example 54, wherein the compacting is effected by an apparatus comprising a roller compactor, wherein the speed of the roller compactor is about 8 rpm, wherein the pressure exerted by the roller compactor is about 1700 psi, and wherein the temperature does not exceed about 130 degrees Fahrenheit.

Further Example 91

A fully water-soluble granule according to further example 54, wherein the granule is between about 0.5 mm and about 4.5 mm.

Further Example 92

A fully water-soluble granule according to further example 54, wherein the granule is between about 0.8 mm and about 4.0 mm.

Further Example 93

A fully water-soluble granule according to further example 54, wherein the granule is between about 0.8 mm and about 2.0 mm.

Further Example 94

A fully water-soluble granule according to further example 54, wherein the granule is between about 2.1 mm and about 4.0 mm.

Further Example 95

A fully water-soluble granule according to further example 54, wherein at least about 75% of the granule is dissolved in five minutes when the granule is submerged in one liter of water at a temperature of 25 degrees Celsius.

Further Example 96

A fully water-soluble granule according to further example 54, wherein at least about 90% of the granule is dissolved in five minutes when the granule is submerged in one liter of water at a temperature of 25 degrees Celsius.

Further Example 97

A fully water-soluble granule according to further example 54, wherein at least about 95% of the granule is dissolved in five minutes when the granule is submerged in one liter of water at a temperature of 25 degrees Celsius.

Further Example 98

A fully water-soluble granule according to further example 54, wherein at least about 99% of the granule is dissolved in five minutes when the granule is submerged in one liter of water at a temperature of 25 degrees Celsius.

Further Example 99

A fully water-soluble granule according to further example 54, wherein 100% of the granule is dissolved in five minutes when the granule is submerged in one liter of water at a temperature of 25 degrees Celsius.

Further Example 100

A fully water-soluble granule according to further example 54, wherein at least about 75% of the granule is dissolved in one minute when the granule is submerged in one liter of water at a temperature of 25 degrees Celsius.

Further Example 101

A fully water-soluble granule according to further example 54, wherein at least about 90% of the granule is dissolved in one minute when the granule is submerged in one liter of water at a temperature of 25 degrees Celsius.

Further Example 102

A fully water-soluble granule according to further example 54, wherein at least about 95% of the granule is dissolved in one minute when the granule is submerged in one liter of water at a temperature of 25 degrees Celsius.

Further Example 103

A fully water-soluble granule according to further example 54, wherein at least about 99% of the granule is dissolved in one minute when the granule is submerged in one liter of water at a temperature of 25 degrees Celsius.

Further Example 104

A fully water-soluble granule according to further example 54, wherein 100% of the granule is dissolved in one minute when the granule is submerged in one liter of water at a temperature of 25 degrees Celsius.

Further Example 105

A fully water-soluble granule according to further example 54, wherein the fully water-soluble granule is solubilized forming a fully solubilized solution, and the fully solubilized solution applied to a desired location, such as agricultural soil.

Further Example 106

A fully water-soluble granule according to further example 54, wherein the fully-water soluble granule itself is applied to a desired location, such as agricultural soil.

Aspects of a fully water-soluble composite granule such as is described in various embodiments herein are further illustrated by the following further examples, which are set forth to illustrate certain aspects of the granule such as is described in various embodiments herein and are not to be construed as limiting thereof.

Further Example 107

A fully water-soluble granule comprising:
a homogenous power comprising a hydrolyzed humic acid with a moisture content of about 9% to about 15% and a loose bulk density between about 28 and 49 pounds per cubic feet,
wherein the hydrolyzed humic acid is extracted from leonardite and/or humalite; and
wherein the homogenous powder is granulated via compaction to form the fully water-soluble granule,
wherein the fully water-soluble granule is between about 0.5 mm and about 4.5 mm in diameter, and
wherein about 95% of the fully water-soluble granule dissolves within five minutes when the fully water-soluble granule is submerged in one liter of water at a temperature of 25 degrees Celsius.

Further Example 108

A fully water-soluble granule according to further example 107, wherein the granule is between about 0.8 mm and about 2.0 mm in diameter.

Further Example 109

A fully water-soluble granule according to further example 107, wherein the granule is between about 2.1 mm and about 4.0 mm in diameter.

Further Example 110

A fully water-soluble granule according to further example 107, wherein at least about 99% of the granule dissolves within five minutes when the granule is submerged in one liter of water at a temperature of 25 degrees Celsius.

Further Example 111

A fully water-soluble granule according to further example 107, wherein 100% of the granule is dissolved within five minutes when the granule is submerged in one liter of water at a temperature of 25 degrees Celsius.

Further Example 112

A fully water-soluble granule according to further example 107, wherein at least about 95% of the granule dissolves within one minute when the granule is submerged in one liter of water at a temperature of 25 degrees Celsius.

Further Example 113

A fully water-soluble granule according to further example 107, wherein at least about 99% of the granule dissolves within one minute when the granule is submerged in one liter of water at a temperature of 25 degrees Celsius.

Further Example 114

A fully water-soluble granule according to further example 107, wherein 100% of the granule is dissolved within one minute when the granule is submerged in one liter of water at a temperature of 25 degrees Celsius.

Further Example 115

A fully water-soluble granule according to further example 107, wherein the homogenous powder is granulated via compaction with a roller compactor at a speed of about 8 rpm and wherein the roller compactor exerts a pressure of about 1700 psi and does not exceed a temperature of about 130 degrees Fahrenheit.

Further Example 116

Figure 1B:
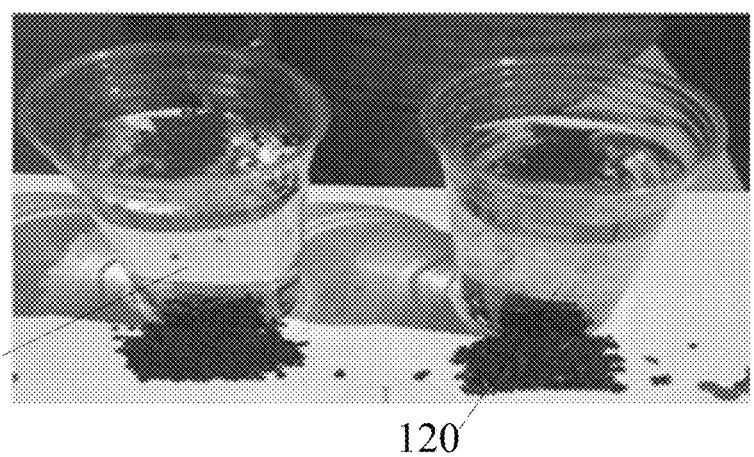
Figure 1C:
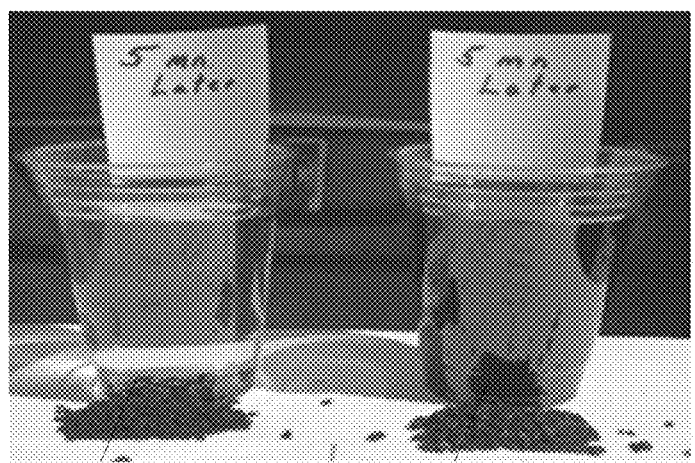

A fully water-soluble granule according to further example 107 is illustrated in FIGS. 1A-C. FIGS. 1A-C illustrate a solubility comparison between raw humate 105, 115, 125 and an embodiment of the fully water-soluble granules enriched in humic acid 110, 120, 130 described herein. The solubility evaluation illustrated in FIGS. 1A-C was conducted by placing one (1) teaspoon of either raw humate or the fully water-soluble granules described herein in one (1) cup of water. The water utilized in this example was tap water at a typical tap temperature (e.g. ranging from about 40 degrees Fahrenheit to about 70 degrees Fahrenheit). More particularly, FIG. 1A illustrates time point zero, where the raw humate 105 and the water-soluble granules 110 as described herein are next to the transparent containers. FIG. 1B illustrates the solubility of the raw humate 115 and the fully water-soluble granules 120 described herein thirty (30) seconds after their placement in the water. As illustrated in FIG. 1B, the water in container where the raw humate 115 was placed remains clear with the raw humate clustered at the bottom, while fully water-soluble granules 120 described herein have already begun dissolving in the water, as evidenced by the change in the shading/color of the water. FIG. 1C illustrates the solubility of the raw humate 125 and the fully water-soluble granules 130 described herein five (5) minutes after their placement in the water. As illustrated in FIG. 1C, the water in container where the raw humate 125 was placed still remains clear with the raw humate clustered at the bottom, while fully water-soluble granules 130 described herein have fully dissolved in the water, as evidenced by the change in the shading/color of the water.

Further Example 117

A fully water-soluble granule according to further example 107, wherein the hydrolyzed humic acid was studied in growers' fields alongside raw humic. Polyethylene porous bags filled with soil, which function as natural soil columns, were used and hydrolyzed using 4 gal/acre. These were porous bag were placed in test plots of growers' fields at the depth of about 12 inches. The dry humic ore was used at the rate of 50 lbs/acre, utilizing the same procedures. At the end of the season, we observed no decomposition in dry ore. However, the hydrolyzed humic acid samples fully decomposed and produced very mallow soils with good moisture. Additionally, and by way of comparison, a separate set of raw humate samples were placed in soil (in polyethylene porous bags) that were kept in field-like conditions for three (3) years. These soil samples were screened for raw humate particles, and measured. Over the course of three (3) years the raw humate particles decomposed about we measured nearly the same amount minus about 2%; this is a stark difference to the fully water soluble granule enriched in humic acid.

Further Example 118

A fully water-soluble granule according to further example 107, wherein the fully water-soluble granule is solubilized forming a fully solubilized solution, and the fully solubilized solution applied to a desired location, such as agricultural soil.

Further Example 119

A fully water-soluble granule according to further example 108, wherein the fully-water soluble granule itself is applied to a desired location, such as agricultural soil.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A fully water-soluble granule comprising:
   a homogenous powder comprising a hydrolyzed humic acid with a moisture content of about 9% to about 15% and a loose bulk density between about 28 and 49 pounds per cubic feet,
      wherein the hydrolyzed humic acid is extracted from leonardite or humalite with an alkaline mixture; and
      wherein the homogenous powder is granulated via compaction to form the fully water-soluble granule,
      wherein the fully water-soluble granule is between about 0.5 mm and about 4.5 mm in diameter, and
      wherein at least 95% of the fully water-soluble granule dissolves within five minutes when the fully water-soluble granule is submerged in one liter of water at a temperature of 25 degrees Celsius.

2. The fully water-soluble granule of claim 1, wherein the granule is between about 0.8 mm and about 2.0 mm in diameter.

3. The fully water-soluble granule of claim 1, wherein the granule is between about 2.1 mm and about 4.0 mm in diameter.

4. The fully water-soluble granule of claim 1, wherein at least 99% of the granule dissolves within five minutes when the granule is submerged in one liter of water at a temperature of 25 degrees Celsius.

5. The fully water-soluble granule of claim 1, wherein at least 95% of the granule dissolves within one minute when the granule is submerged in one liter of water at a temperature of 25 degrees Celsius.

6. The fully water-soluble granule of claim 1, wherein at least 99% of the granule dissolves within one minute when the fully-water soluble granule is submerged in one liter of water at a temperature of 25 degrees Celsius.

7. The fully water-soluble granule of claim 1, wherein the homogenous powder is granulated via compaction with a roller compactor at a speed of about 8 rpm and wherein the roller compactor exerts a pressure of about 1700 psi and does not exceed a temperature of about 130 degrees Fahrenheit.

8. A fully water-soluble granule enriched in humic acid, the granule made by a process comprising:
   obtaining a sample of a carbonaceous substance comprising humic acid and one or more other substances;
   contacting the sample with an amount of an alkaline mixture, thereby forming an extraction mixture, the extraction mixture consisting essentially of a sludge component, the sludge component comprising, predominantly, the sample, and an extraction component, the extraction component comprising, predominantly, the alkaline mixture;
   maintaining the sludge component in contact with the extraction component for a period of time sufficient for the extraction component to become relatively enriched in humic acid and the sludge component to become relatively depleted of humic acid;
   separating the sludge component from the extraction component;
   spray drying the extraction component, thereby forming a plurality of powder particles; and
   compacting, via a roll compactor, at least a portion of the plurality of powder particles,
      wherein the at least a portion of the plurality of powder particles, as a result of the compacting, are made into a form of a fully water-soluble granule with a diameter between about 0.5 mm and about 4.5 mm
      wherein at least 95% of the fully water-soluble granule dissolves within five minutes when the fully water-soluble granule is submerged in one liter of water at a temperature of 25 degrees Celsius.

9. The fully water-soluble granule of claim 8, wherein the roll compactor operates at a speed of about 8 rpm and exerts a pressure of about 1700 psi.

10. The fully water-soluble granule of claim 8, wherein the process further comprises:
   rehydrating the fully water-soluble granule, thereby forming a rehydrated solution; and
   applying the rehydrated solution to a desired location.

* * * * *